(12) United States Patent
Nakai et al.

(10) Patent No.: US 7,770,597 B2
(45) Date of Patent: Aug. 10, 2010

(54) SPOOL VALVE DEVICE

(75) Inventors: Masaya Nakai, Anjo (JP); Takahiro Kokubu, Anjo (JP); Haruki Yamamoto, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 975 days.

(21) Appl. No.: 11/502,363

(22) Filed: Aug. 11, 2006

(65) Prior Publication Data

US 2007/0051414 A1    Mar. 8, 2007

(30) Foreign Application Priority Data

Aug. 17, 2005   (JP) .............................. 2005-236983

(51) Int. Cl.
*F15B 13/04* (2006.01)
(52) U.S. Cl. .................. 137/625.69; 251/282
(58) Field of Classification Search ............ 137/625.65, 137/625.69; 251/129.01, 282
See application file for complete search history.

(56) References Cited

U.S. PATENT DOCUMENTS

| | | | |
|---|---|---|---|
| 4,155,535 A | 5/1979 | Seamone | |
| 4,220,178 A | 9/1980 | Jackson | |
| 4,941,508 A | 7/1990 | Hennessy et al. | |
| 5,799,697 A | 9/1998 | Sakaguchi et al. | |

FOREIGN PATENT DOCUMENTS

| | | |
|---|---|---|
| JP | A-51-115329 | 10/1976 |
| JP | U-53-096240 | 8/1978 |
| JP | U-63-048067 | 4/1988 |
| JP | A-9-072451 | 3/1997 |
| JP | A-10-132096 | 5/1998 |
| JP | A-2005-133880 | 5/2005 |

*Primary Examiner*—John Rivell
(74) *Attorney, Agent, or Firm*—Oliff & Berridge, PLC (57) ABSTRACT

A spool valve system includes a valve main body with, from a first side to a second side, an input port to which an input pressure is supplied, an output port that outputs an output pressure, and a drain port that discharges the input pressure; and a spool that is structured to move freely relative to the valve main body, the spool including, from the first side to the second side, a first land, a groove that is formed adjacent to the first land, and a second land that is formed adjacent to the groove.

9 Claims, 5 Drawing Sheets

FIG. 1

RELATED ART

FIG. 2

RELATED ART

SPOOL VALVE DEVICE

INCORPORATION BY REFERENCE

The disclosure of Japanese Patent Application No. 2005-236983, filed on Aug. 17, 2006, including the specification, drawings and abstract is incorporated herein by reference in its entirety.

BACKGROUND

The present invention relates to a spool valve system.

Various types of solenoid valves are installed in a hydraulic circuit of an automatic transmission that is mounted in a vehicle. Each solenoid valve includes a solenoid portion and a valve portion. The valve portion is driven by supplying electric current to a coil of the solenoid portion. The valve portion opens and closes oil passages, adjusts the oil flow volume, and adjusts the hydraulic pressure.

Figure 1:
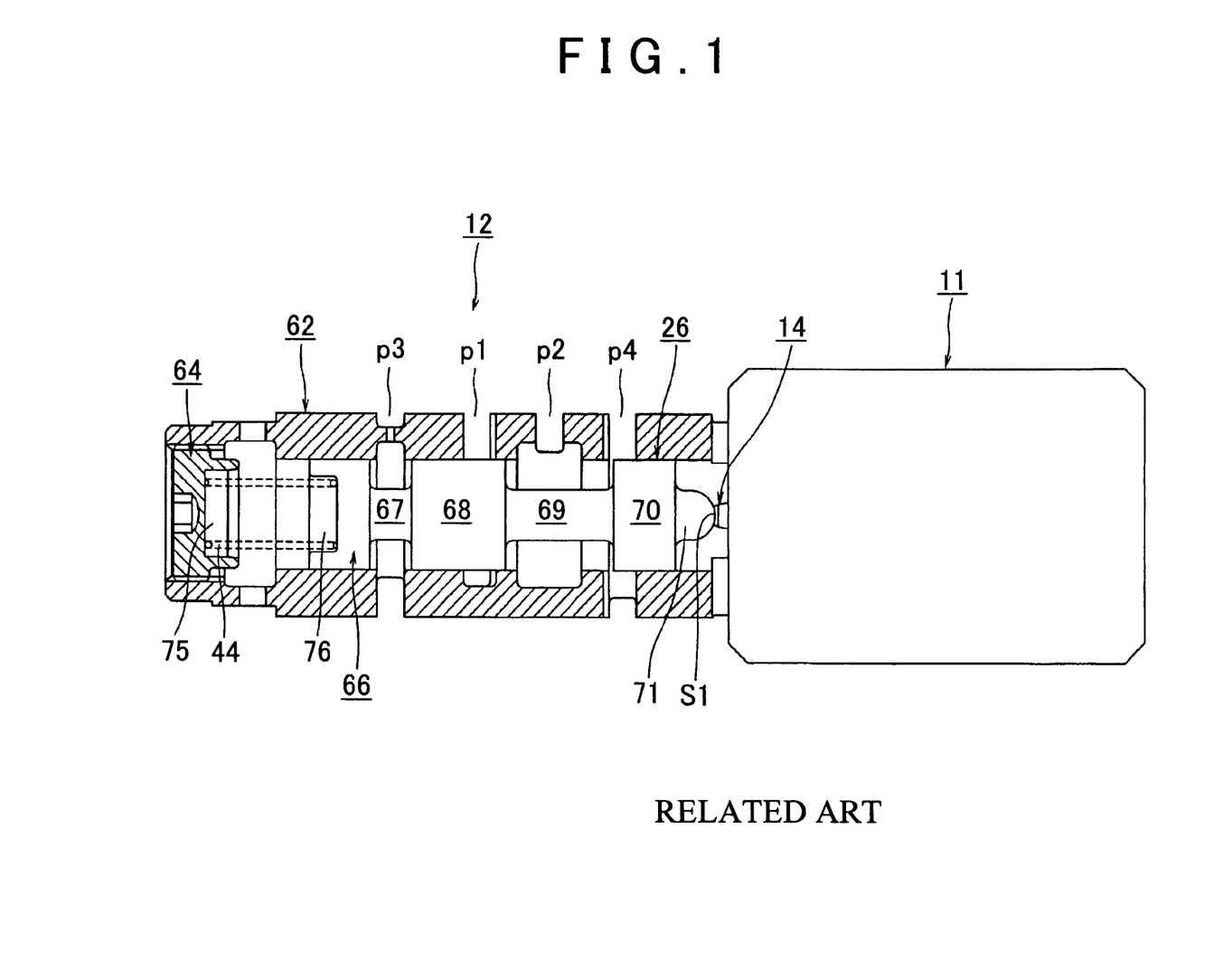
FIG. 1 is a sectional view of a conventional linear solenoid valve.

FIG. 1 is a sectional view of a conventional linear solenoid valve. In FIG. 1, reference numeral 11 denotes the solenoid portion, and reference numeral 12 denotes a pressure adjustment valve portion that serves as the valve portion and is operated by driving the solenoid portion 11. The solenoid portion 11 includes a coil assembly (not shown in FIG. 1), a plunger 14 that is installed such that it advances and retracts (moves to the left and right in FIG. 1) freely in relation to the coil assembly, and the like. A rear end (the right end in FIG. 1) of a spool 26 in the pressure adjustment valve portion 12 is brought into contact with a front end face S1 (the left end face in FIG. 1) of the plunger 14.

The plunger 14 is drawn by the coil in the coil assembly with a prescribed attractive force such that a thrust force is generated in the plunger 14. The thrust force is transmitted to the spool 26 such that the pressure adjustment valve portion 12 is operated, the flow volume of oil is adjusted, and the hydraulic pressure is adjusted.

The pressure adjustment valve portion 12 includes a sleeve-shaped valve main body 62, the spool 26, an end plate 64, a spring 44, and the like. The spool 26 is installed such that it advances and retracts freely, and slides freely in relation to the valve main body 62. The end plate 64 is fixed to the front end (the left end in FIG. 1) of the valve main body 62 by helical threads. The spring 44 is installed between the end plate 64 and the front end of the spool 26 and energizes the spool 26 toward the solenoid portion 11 under a prescribed spring load. Note that the valve main body 62 is attached to a valve body (not shown in FIG. 1) by a prescribed method, such as press-fitting for example.

The spool 26 includes a medium-diameter land 66, a groove 67, a large-diameter land 68, a small-diameter groove 69, a large-diameter land 70, and a small-diameter plunger contact portion 71. The land 66 is formed at the front end of the spool 26. The groove 67 is a small-diameter portion between lands 66, 68 that is formed adjacent to and rearward (rightward in FIG. 1) of the land 66. The land 68 is formed adjacent to and rearward of the groove 67. The groove 69 is formed adjacent to and rearward of the land 68. The land 70 is formed adjacent to and rearward of the groove 69. The plunger contact portion 71 is formed adjacent to and rearward of the land 70.

A concavity 75 is formed on the rear end face (the right end face in FIG. 1) of the end plate 64, and a concavity 76 is formed on the front end face of the land 66. The spring 44 is installed such that its front end is positioned in the concavity 75, and its rear end is positioned in the concavity 76. The end plate 64 not only prevents the spool 26 from protruding from the valve main body 62, but also serves to adjust the spring load. The spring load can be adjusted by rotating the end plate 64 such that it moves forward or rearward.

The valve main body 62 includes an input port p1, an output port p2, a feedback port p3, and a drain port p4. An input pressure is supplied via the input port p1. The output port p2 outputs an output pressure to a shift valve (not shown in FIG. 1). The drain port p4 discharges the input pressure. The feedback port p3 is connected to the output port p2 via a feedback oil passage (not shown in FIG. 1) that is formed outside the valve main body 62. The output pressure is supplied as a feedback pressure, generating a feedback force that corresponds to the difference in the surface areas of the lands 66 and 68 and that pushes the spool 26 rearward.

Therefore, the spool 26 receives the thrust force from the plunger 14, the spring load from the spring 44, and the feedback force from the feedback pressure, and with the plunger contact portion 71 in a state of contact with the front end face S1, the spool 26 advances and retracts as a single unit with the plunger 14.

SUMMARY

However, in the conventional linear solenoid valve, when the opening of the input port p1 is small, and particularly when the input pressure is high like the line pressure, the inward flow of oil from the input port p1 causes a side force to be applied in the radial direction of the spool 26 and a flow force to be applied in the axial direction of the spool 26.

Figure 2:
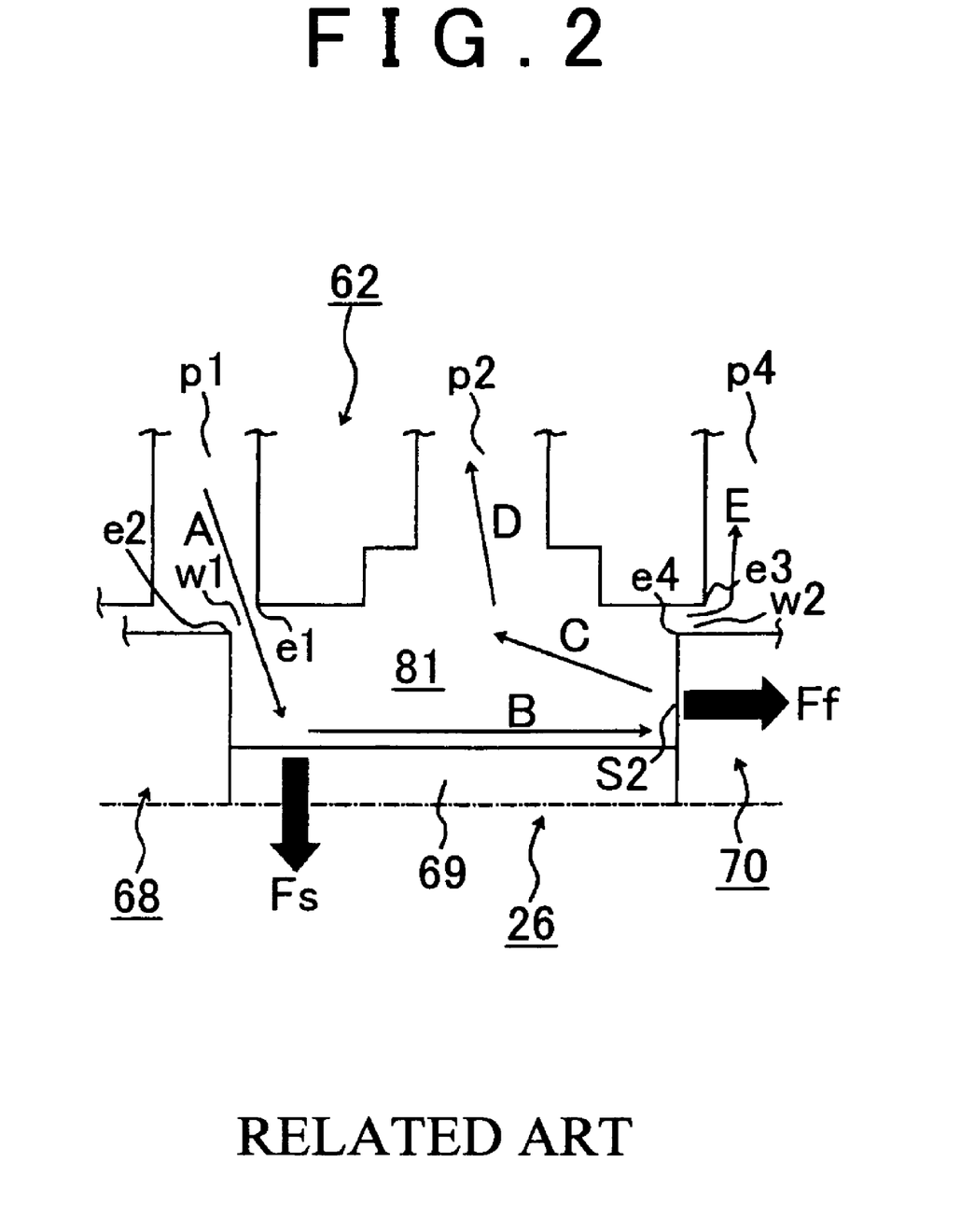
FIG. 2 is a sectional view of a main part of a conventional linear solenoid valve.

FIG. 2 is a sectional view of a main part of the conventional linear solenoid valve. In FIG. 2, reference numeral 26 denotes the spool, reference numeral 62 denotes the valve main body, reference numerals 68, 70 denote the lands, reference numeral 69 denotes the groove, reference numeral p1 denotes the input port, reference numeral p2 denotes the output port, and reference numeral p4 denotes the drain port.

Oil supplied to the input port p1 passes through a gap w1 between an edge e1 on the rear edge (the right edge in FIG. 2) of the input port p1 and an edge e2 on the rear edge of the land 68, as indicated by arrow A. The oil flows into a cylindrical oil chamber 81 that is formed by the valve main body 62, the lands 68, 70, and the groove 69.

Next, the oil strikes the groove 69 and is deflected, as indicated by arrow B, such that it flows along the groove 69. As the oil strikes a front end face (the left end face in FIG. 2) S2 of the land 70, the direction of the oil flow is reversed, and after the oil has flowed as indicated by arrow C, it is output from the output port p2, as indicated by arrow D.

Note that a prescribed amount of the oil passes through a gap w2 between an edge e3 on the front edge (the left edge in FIG. 2) of the drain port p4 and an edge e4 on a front edge of the land 70, as indicated by arrow E, and is sent to the drain port p4.

Incidentally, the oil that strikes against the groove 69 that has flowed into the oil chamber 81 causes a side force Fs to be generated in the radial direction of the spool 26 toward the side opposite the input port p1. The striking oil that has flowed along the groove 69 against the front end face S2 of the land 70 causes a flow force Ff to be generated in the axial direction of the spool 26 toward the solenoid portion 11 (FIG. 1).

The side force Fs presses the spool 26 against the inside perimeter face of the valve main body 62 on the opposite side from the input port p1, while the flow force Ff presses the spool 26 against the solenoid portion 11, destroying the balance between the thrust force from the plunger 14 and the spring load and feedback force. Therefore, it becomes impossible for the spool 26 to advance and retract smoothly and for a stable output pressure to be generated.

The response time of the linear solenoid valve is also increased, which diminishes responsiveness, increases hysteresis, and makes the drive feeling worse during shifting.

The present invention this provides, among other things, a spool valve system that solves the problems of the conventional linear solenoid valve, shortens the response time, increases responsiveness, reduces hysteresis, and improves a drive feeling during shifting.

The spool valve system according to an exemplary aspect of the present invention includes a valve main body with, from a first side to a second side, an input port to which an input pressure is supplied, an output port that outputs an output pressure, and a drain port that discharges the input pressure; and a spool that is structured to move freely relative to the valve main body, the spool including, from the first side to the second side, a first land, a groove that is formed adjacent to the first land, and a second land that is formed adjacent to the groove. The groove includes, from the first side to the second side a first tapered portion that is formed from the first land to a neck portion, the neck portion, and a second tapered portion that is formed from the neck portion to the second land. The second tapered portion is formed such that, when an axial direction edge portion between the first land and the groove is positioned between an axial direction edge portion on a non-driving portion side of the input port and an axial direction edge portion on a driving portion side of the input port, a face of the output port that extends in a radial direction is positioned on a line that is an extension of the second tapered portion.

BRIEF DESCRIPTION OF THE DRAWINGS

Various embodiments of the invention will be described with reference to the drawings, wherein.

DETAILED DESCRIPTION OF PREFERRED EMBODIMENTS

An embodiment of the present invention will be explained below with reference to the drawings. Here, a linear solenoid valve will be explained as a spool valve system and as a solenoid valve.

Figure 3:
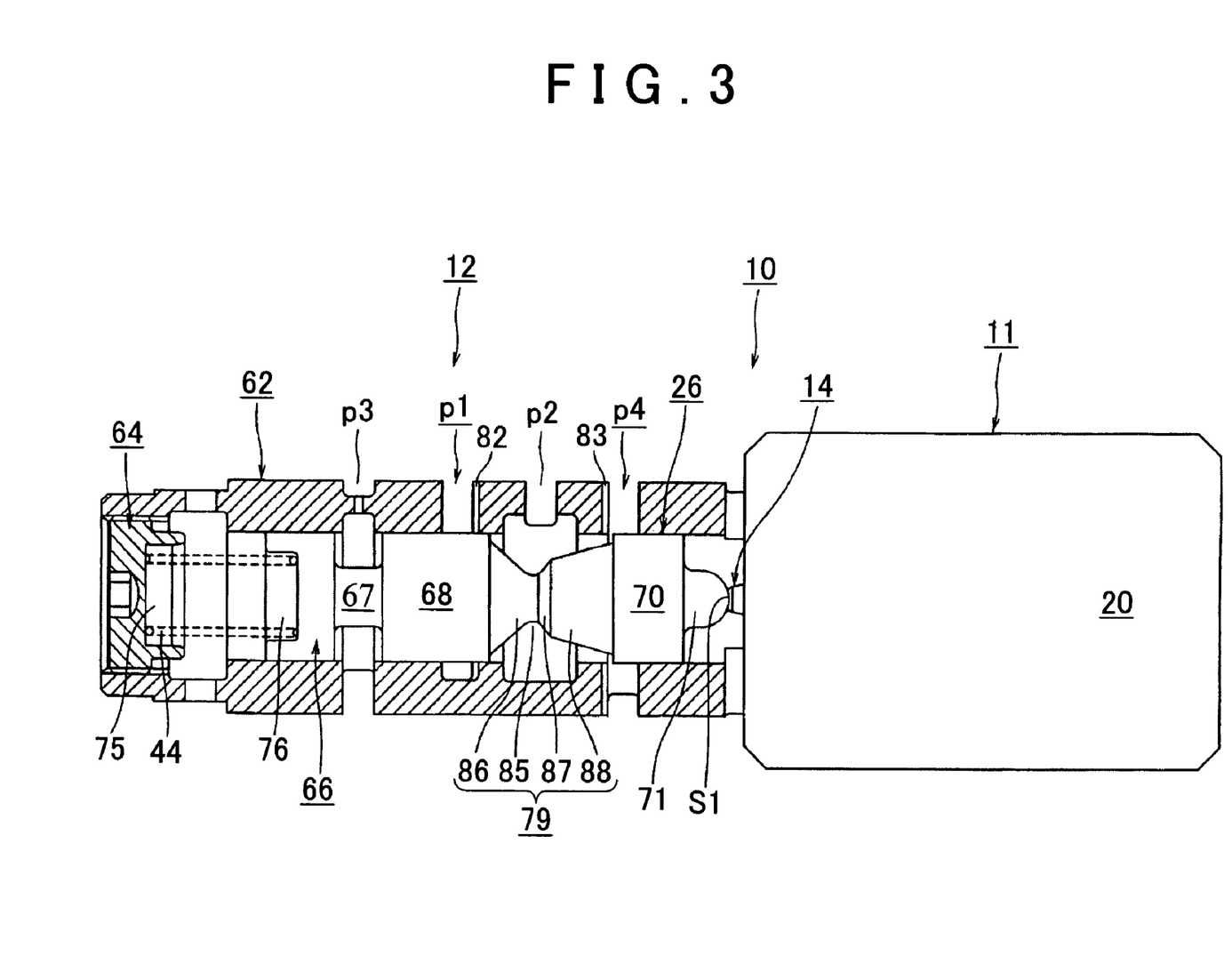
FIG. 3 is a sectional view of a linear solenoid valve according to an embodiment of the present invention.

FIG. 3 is a sectional view of a linear solenoid valve according to the embodiment of the present invention. In FIG. 3, reference numeral 10 denotes the linear solenoid valve. The linear solenoid valve is installed in a hydraulic circuit in an automatic transmission, for example. In the hydraulic circuit, the pressure of oil discharged from an oil pump (not shown in FIG. 3) is adjusted by a primary regulator valve (not shown in FIG. 3) such that it becomes a line pressure. The line pressure is supplied as an input pressure to the linear solenoid valve 10.

The linear solenoid valve 10 is operated based on an electric current. A hydraulic pressure that corresponds to the electric current is supplied by the linear solenoid valve 10 to a hydraulic servo of a friction engagement element (not shown in FIG. 3), such as a clutch or brake for example.

Reference numeral 11 denotes a solenoid portion that makes up a solenoid drive unit, and reference numeral 12 denotes a pressure adjustment valve portion that makes up a valve unit that is operated by driving the solenoid portion 11. Note that in the explanation of the present invention, the side of the linear solenoid valve 10 where the pressure adjustment valve portion 12 is installed is the front side or forward direction, and the side of the linear solenoid valve 10 where the solenoid portion 11 is installed is the rear side or rearward direction. In the pressure adjustment valve portion 12, the front side is a non-driving portion side, and the rear side is the driving portion side.

The linear solenoid valve 10 is normally installed in a horizontal orientation in an automatic transmission case (not shown in FIG. 3) so that it is not affected by gravity. The solenoid portion 11 includes a coil assembly (not shown in FIG. 3), a plunger 14 that is installed such that it advances and retracts (moves to the left and right in FIG. 3) freely in relation to the coil assembly, and a yoke 20, which serves as a cylindrical housing that is installed such that it surrounds the coil assembly.

The coil assembly is made up of a cylindrical body that includes a coil and an end portion. A hollow portion is formed in the cylindrical body, and the plunger 14 is fitted into the hollow portion such that the plunger 14 slides freely. Therefore, the plunger 14 is supported by the coil assembly in a state in which the plunger 14 is fitted into the hollow portion.

A rear end (the right end in FIG. 3) of a spool 26 in the pressure adjustment valve portion 12 is brought into contact with a front end face S1 (the left end face in FIG. 3) of the plunger 14.

An electric current is made to flow through the coil in the coil assembly, and the plunger 14 is drawn by the coil with a prescribed attractive force such that a thrust force Fpl is generated in the plunger 14. The thrust force Fpl is transmitted to the spool 26 such that the pressure adjustment valve portion 12 is operated, the flow volume of oil is adjusted, and the hydraulic pressure is adjusted.

The pressure adjustment valve portion 12 includes a valve main body 62, the spool 26, an end plate 64, a spring 44, and the like. The spool 26 is inserted such that it advances and retracts freely in relation to the valve main body 62. The end plate 64 is fixed to the front end (the left end in FIG. 3) of the valve main body 62 by helical threads. The spring 44 is installed between the end plate 64 and the front end of the spool 26 and serves as an energizing member that energizes the spool 26 toward the solenoid portion 11 under a prescribed spring load Fsp. Note that in this embodiment, the valve main body 62 is assembled into a valve body, but a hole can be formed in the valve body, and the spool 26 can be inserted into the hole. In that case, the valve body makes up the valve main body, an input port, an output port, a feedback port, a drain port, and the like are formed in the valve body, and the solenoid portion is attached to the valve body.

In order of arrangement from the front side to the rear side (or first side to second side for example), which in this embodiment is from the non-driving portion side to the driving portion side, the spool 26 includes a medium-diameter land 66, a small-diameter groove 67, a large-diameter land 68, a small-diameter groove 79, a large-diameter land 70, and a small-diameter plunger contact portion 71. The land 66 is formed at the front end of the spool 26. The groove 67 is formed adjacent to and rearward (rightward in FIG. 3) of the land 66. The land 68, which serves as a first land, is formed adjacent to and rearward of the groove 67. The groove 79 is formed adjacent to and rearward of the land 68. The land 70, which serves as a second land, is formed adjacent to and rearward of the groove 79. The plunger contact portion 71 is formed adjacent to and rearward of the land 70. The groove 79 is made up of a neck portion 85, a first tapered portion 86, and second and third tapered portions 87, 88. The neck portion 85 is formed almost in the middle of the groove 79 and has the smallest diameter. The first tapered portion 86 is formed forward (leftward in FIG. 3) of the neck portion 85, that is, on the land 68 side of the neck portion 85. The second and third tapered portions 87, 88 are formed rearward of the neck portion 85, that is, on the land 70 side of the neck portion 85. In the axial direction, the first tapered portion 86, the neck portion 85, and the second and third tapered portions 87, 88 are formed in that order from the non-driving portion side to the driving portion side. Note that the narrowest portion is formed by the neck portion 85.

A concavity 75 is formed on the rear end face (the right end face in FIG. 3) of the end plate 64, and a concavity 76 is formed on the front end face of the land 66. The spring 44 is installed such that its front end is positioned in the concavity 75, and its rear end is positioned in the concavity 76. The end plate 64 not only prevents the spool 26 from protruding from the valve main body 62, but also serves to adjust the spring load Fsp. The spring load Fsp can be adjusted by rotating the end plate 64 such that it moves forward or rearward.

The valve main body 62 includes, in prescribed positions in the axial direction, an input port p1, an output port p2, a feedback port p3, and a drain port p4. An input pressure is supplied via the input port p1. The output port p2 outputs an output pressure to the hydraulic servo. The feedback port p3, the input port p1, the output port p2, and the drain port p4 are formed in the axial direction of the valve main body 62 in that order from the non-driving portion side to the driving portion side (or first side to second side for example). The feedback port p3 is connected to the output port p2 via a feedback oil passage (not shown in FIG. 3) that is formed outside the valve main body 62. The output pressure is supplied as a feedback pressure, generating a feedback force Ffb that corresponds to the difference in the surface areas of the lands 66 and 68 and that pushes the spool 26 rearward. A notch 82 is formed in the rear end face of the input port p1, and a notch 83 is formed in the front end face of the drain port p4. The land 68 is formed facing the input port p1, and the groove 79 is formed facing the output port p2.

Therefore, the spool 26 receives the thrust force Fpl, the spring load Fsp, and the feedback force Ffb, and with the plunger contact portion 71 in a state of contact with the front end face S1, the spool 26 advances and retracts as a single unit with the plunger 14. When the spool 26 is in a stopped state at a prescribed position in a pressure adjustment range that is set in order to generate the output pressure, the thrust force Fpl is balanced against the spring load Fsp and the feedback force Ffb, as follows:

$Fpl = Fsp + Ffb$

Note that the pressure adjustment range is the range in which the input pressure is input and the prescribed output pressure is generated. The pressure adjustment range is also the range in which the prescribed feedback pressure is applied to the spool 26. The prescribed feedback range also includes the range in which the output pressure that is generated is equal to the input pressure.

Next, the operation of the linear solenoid valve 10 that is configured as described above will be explained.

When the plunger 14 is in its initial position and electric current is supplied to the coil, the plunger 14 is drawn by the coil under a prescribed attractive force, and the thrust force Fpl is generated in the plunger 14. The thrust force Fpl is transmitted to the spool 26 in opposition to the spring load Fsp and the feedback force Ffb. The pressure adjustment valve portion 12 is operated, advancing the spool 26 (moving it leftward in FIG. 3). In this case, the position of the spool 26 is controlled based on the stroke of the plunger 14. Thus the ratio of the flow through the input port p1 and the drain port p4 is controlled, and the hydraulic pressure is adjusted linearly. The adjusted hydraulic pressure is output as the output pressure from the output port p2.

When the supply of electric current to the coil is cut off, the spool 26 and the plunger 14 are made to retract (move rightward in FIG. 3) by the spring load Fsp and the feedback force Ffb, and the plunger 14 returns to its initial position.

Incidentally, when the opening of the input port p1 is small, and particularly when the input pressure is high like the line pressure, the inward flow of oil from the input port p1 causes a side force Fs to be applied in the radial direction of the spool 26 and a flow force Ff to be applied in the axial direction of the spool 26. The side force Fs presses the spool 26 against the inside perimeter face of the valve main body 62 on the opposite side from the input port p1, while the flow force Ff presses the spool 26 against the solenoid portion 11, effectively destroying the balance between the thrust force Fpl and the spring load Fsp and feedback force Ffb.

This diminishes the responsiveness of the linear solenoid valve 10, increases hysteresis, and makes drive feeling worse during shifting.

Therefore, as described above, in this embodiment, the groove 79 is provided with the neck portion 85 and the first to third tapered portions 86 to 88.

Figure 4:
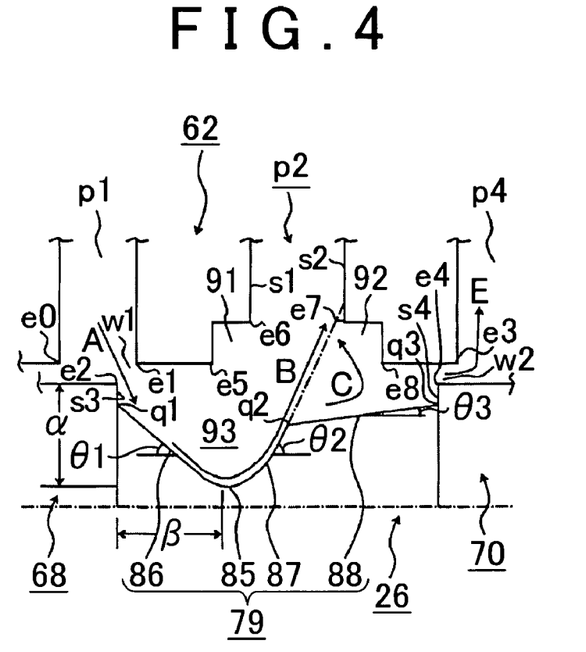
FIG. 4 is a sectional view of a main part of the linear solenoid valve according to the embodiment of the present invention.
Figure 5:
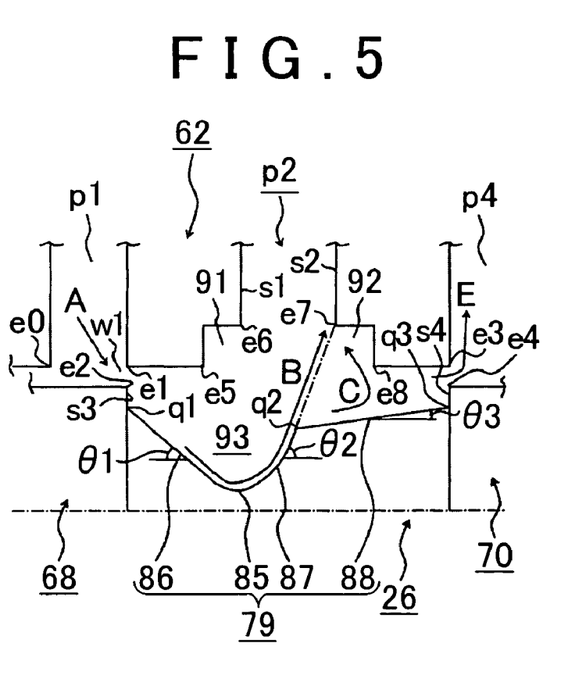
FIG. 5 is a drawing showing a first state in which a spool is arranged in a pressure adjustment range according to the embodiment of the present
Figure 6:
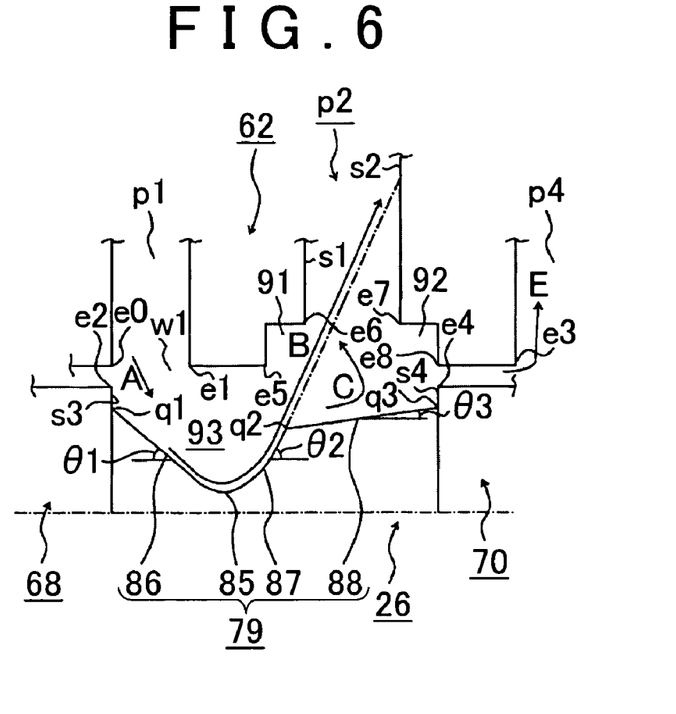
FIG. 6 is a drawing showing a second state in which the spool is arranged in the pressure adjustment range according to the embodiment of the present invention.
Figure 7:
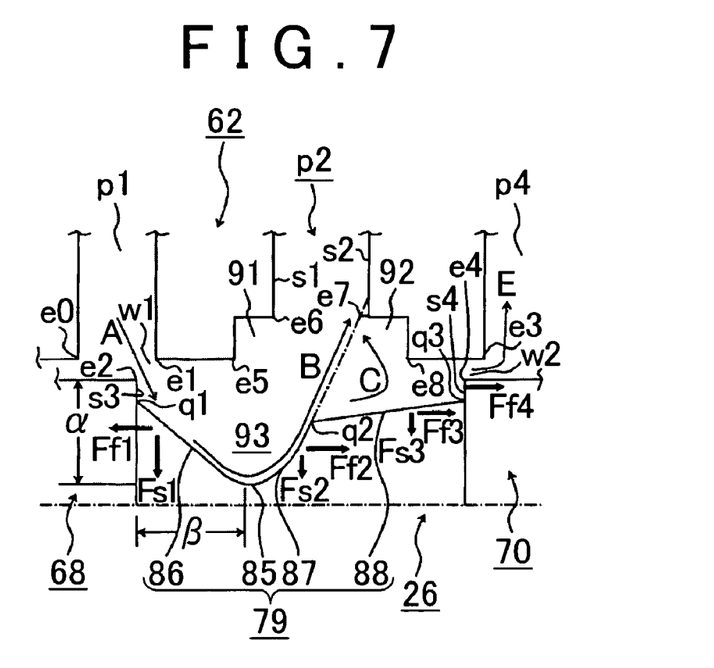
FIG. 7 is a drawing showing side forces and flow forces that are applied to the spool according to the embodiment of the present invention.

FIG. 4 is a sectional view of a main part of the linear solenoid valve according to this embodiment of the present invention. FIG. 5 is a drawing showing a first state in which the spool is arranged in the pressure adjustment range according to this embodiment of the present invention. FIG. 6 is a drawing showing a second state in which the spool is arranged in the pressure adjustment range according to this embodiment of the present invention. FIG. 7 is a drawing showing side forces and flow forces that are applied to the spool according to the embodiment of the present invention.

In FIGS. 4 to 7, reference numeral 26 denotes the spool, reference numeral 62 denotes the valve main body, reference numerals 68, 70 denote the lands, reference numeral 79 denotes the groove, reference numeral p1 denotes the input port, reference numeral p2 denotes the output port, and reference numeral p4 denotes the drain port. Also, step portions 91, 92 are respectively formed on a front edge (the left edge in FIGS. 4 to 6) and a rear edge (the right edge in FIGS. 4 to 6) of an opening of the output port p2 that faces the inside perimeter face of the valve main body 62, enlarging the area of the opening.

An edge e0 is formed on the front edge of the input port p1, and an edge e1 is formed on the rear edge of the input port p1. An edge e2 is formed on the rear edge of the land 68. An edge e5 is formed on a radially inward front edge of the step portion 91, and an edge e6 is formed on a radially outward rear edge of the step portion 91. An edge e7 is formed on a radially outward front edge of the step portion 92, and an edge e8 is formed on a radially inward rear edge of the step portion 92. An edge e3 is formed on the front edge of the drain port p4. An edge e4 is formed on the front edge of the land 70. The edges e0 to e8 make up axial direction edge portions.

The first tapered portion 86 extends slantingly rearward (rightward in FIGS. 4 to 6) and radially inward from a point q1 that is slightly radially inward from the edge e2 on the rear end face of the land 68 (i.e., the land 68 extends farther outward in the radial direction than the first tapered portion 86). The first tapered portion 86 is formed at a first angle θ1, which is expressed as an acute angle in relation to the axial center of the spool 26 and in this embodiment is approximately 45 degrees, such that its diameter increases toward the front (leftward in FIGS. 4 to 6) and decreases toward the rear. Note that in this embodiment, the first angle θ1 is formed to be approximately 45 degrees, but it is desirable for the first angle θ1 to be made a prescribed angle not greater than 45 degrees.

The neck portion 85 is formed between the first and second tapered portions 86, 87. If the distance between the edge e2 and the neck portion 85 in the radial direction (the distance between the outside perimeter face of the land 68 and the outside perimeter face of the narrowest portion of the neck portion 85) is α, and the distance between the edge e2 and the neck portion 85 in the axial direction is β, the distances α and β are approximately equal:

$$\alpha \approx \beta$$

The second tapered portion 87 extends slantingly rearward and radially outward from the neck portion 85. The second tapered portion 87 is formed at a second angle θ2, which is expressed as an acute angle in relation to the axial center of the spool 26, such that its diameter decreases toward the front and increases toward the rear. The second tapered portion 87 terminates at a point q2 that is farther inward in the radial direction than the point q1 (i.e., the first tapered portion 86 extends further outward in the radial direction than the second tapered portion 87).

As the electric current is supplied to the coil, the spool 26 moves through the pressure adjustment range in relation to the valve main body 62. As the spool 26 moves, it takes a first position, as shown in FIG. 5, where the edges e1 and e2 are in the same position in the axial direction, and a second position, as shown in FIG. 6, where the edges e0 and e2 are in the same position in the axial direction.

The second angle θ2 is set such that when the spool 26 is positioned between the first and second positions, that is, when the edge e2 (which is an axial direction edge portion between the land 68 and the groove) is between the edges e0 (which is an axial direction edge portion on a non-driving portion side) and e1 (which is an axial direction edge portion on a driving portion side) of the input port p1, a face of the output port p2 that extends outward in the radial direction from the step portion 92, which in this embodiment is a side face s2 (which is an example of a side wall), is positioned on a line that is an extension of the second tapered portion 87 (i.e., an imaginary line that extends from the point q2 of the second tapered portion 87 to the side face s2 at the second angle θ2).

Note that in this embodiment, the step portions 91, 92 are formed in the output port p2, and the second angle θ2 is set such that the side face s2, which extends outward in the radial direction from the step portion 92, is positioned on the line that is an extension of the second tapered portion 87. However, even if no step portions are formed in the output port p2, the second angle θ2 is set such that the side face s2 is positioned on the line that is an extension of the second tapered portion 87.

The third tapered portion 88 extends slantingly rearward and radially outward from the point q2. The third tapered portion 88 is formed at a third angle θ3, which is expressed as an acute angle in relation to the axial center of the spool 26 that is different from the second angle θ2 and, in this embodiment, is smaller than the second angle θ2, such that the diameter of the third tapered portion 88 decreases toward the front and increases toward the rear. The third tapered portion 88 terminates on the front end face of the land 70 at a point q3 that is in the same position in the radial direction as the point q1. Note that ring-shaped faces s3, s4, which are orthogonal to the axial direction of the spool 26, are respectively formed in the small intervals between the edge e2 and the point q1 and between the edge e4 and the point q3. The faces s3, s4 are formed so that measuring instruments can be placed in contact with them when the axial lengths of the lands 68, 70, and the like are measured during the manufacture of the spool 26.

Oil supplied by the input port p1 passes through a gap w1 between the edges e1 and e2, as indicated by arrow A, and flows into a cylindrical oil chamber 93 that is formed by the valve main body 62, the lands 68, 70, and the groove 79.

Next, the oil strikes the first tapered portion 86 and is deflected, as indicated by arrow B, such that it flows slantingly inward in the radial direction along the first tapered portion 86 toward the neck portion 85. At the neck portion 85, the oil is deflected such that it reverses direction and flows slantingly outward in the radial direction along the second tapered portion 87. When the oil arrives at the point q2, the greater part of the oil continues flowing toward the output port p2 and is discharged from the output port p2. Other oil, after flowing slantingly outward in the radial direction along the third tapered portion 88, strikes the land 70 and is deflected such that it reverses direction and flows toward the output port p2, as indicated by arrow C, and is then discharged from the output port p2.

Note that a prescribed amount of the oil passes through the gap w2 between the edges e3 and e4 and is sent to the drain port p4, as indicated by arrow E.

Incidentally, because the oil supplied by the input port p1 flows into the oil chamber 93 as the gap opens between the edges e1 and e2, it tends to flow along a line that bisects an angle (of 90 degrees) formed by the rear end face of the land 68 and the inside perimeter face of the valve main body 62. Therefore, it is understood that the oil that passes through the gap w1 flows into the oil chamber 93 at an angle of approximately 45 degrees in relation to the rear end face of the land 68 and the inside perimeter face of the valve main body 62, that is, at an angle of approximately 45 degrees in relation to the axial center of the spool 26. Accordingly, it is desirable for the first angle θ1 of the first tapered portion 86 to be approximately 45 degrees.

Incidentally, due to problems in the manufacture of the spool 26, the first tapered portion 86 cannot be formed continuously from the edge e2 to the neck portion 85, so it becomes necessary to form the face s3 between the edge e2 and the point q1, as described above. That is why the first angle θ1 is set to no greater than 45 degrees in relation to the axial center of the spool 26.

Therefore, the oil that flows into the oil chamber 93 at an angle of approximately 45 degrees strikes the first tapered portion 86 and is deflected such that it flows along the first tapered portion 86. At this time, as shown in FIG. 7, a force that is generated as the oil flow is deflected is divided into a force Fs1, which is oriented in the radial direction of the spool 26 toward the side opposite the input port p1, and a force Ff1, which is oriented toward the front in the axial direction of the spool 26.

In contrast to the first tapered portion 86, which extends inward in the radial direction, the second tapered portion 87 extends outward in the radial direction, so after the oil that flows along the first tapered portion 86 passes the neck portion 85 and strikes the second tapered portion 87, it is deflected such that it flows along the second tapered portion 87. At this time, a force that is generated as the oil flow is deflected is divided into a force Fs2, which is oriented in the radial direction of the spool 26 toward the side opposite the input port p1, and a force Ff2, which is oriented toward the rear in the axial direction of the spool 26.

The third tapered portion 88 extends outward in the radial direction, so the other oil that was divided at the point q2, after striking the third tapered portion 88, is deflected such that it flows along the third tapered portion 88. At this time, a force that is generated as the oil flow is deflected is divided into a force Fs3, which is oriented in the radial direction of the spool 26 toward the side opposite the input port p1, and a force Ff3, which is oriented toward the rear in the axial direction of the spool 26.

Face s4 is formed at the rear edge of the third tapered portion 88, so the oil that flows along the third tapered portion 88 strikes the land 70 and is deflected such that it reverses direction and flows toward the output port p2. At this time, a force that is generated as the oil flow is deflected forms a force Ff4, which is oriented toward the rear in the axial direction of the spool 26.

Therefore, the side force $\Sigma Fs$ is expressed as follows:

$$\Sigma Fs = Fs1 + Fs2 + Fs3$$

The flow force $\Sigma Ff$ is expressed as follows:

$$\Sigma Ff = Ff1 + Ff2 + Ff3 + Ff4$$

The side force $\Sigma Fs$ and the flow force $\Sigma Ff$ both decrease.

That is, in this embodiment, because the forces that are generated as the flow of oil is deflected at the first to third tapered portions 86 to 88 are divided, the side force $\Sigma Fs$ and the flow force $\Sigma Ff$ both decrease.

Therefore, the pressing of the spool 26 by the side force $\Sigma Fs$ against the inside perimeter face of the valve main body 62 on the opposite side from the input port p1 can be suppressed, which can reduce the friction that is generated between the spool 26 and the valve main body 62 and reduce the sliding resistance when the spool 26 advances and retracts. Thus the spool 26 can advance and retract smoothly.

The pressing of the spool 26 against the solenoid portion 11 by the flow force $\Sigma Ff$ can also be suppressed, which can prevent the collapse of the balance between the thrust force Fpl and the spring load Fsp and feedback force Ffb, so that the output pressure can be output stably.

Therefore, the responsiveness of the linear solenoid valve 10 can be increased, hysteresis can be decreased, and the drive feeling during shifting can be improved.

In this embodiment, the line pressure is supplied as the input pressure to the linear solenoid valve 10, and the output pressure is supplied directly to the hydraulic servo. However, a regulator valve is installed between the line pressure oil passage and the linear solenoid valve 10, and a control valve and a shift valve are installed between the linear solenoid valve 10 and the hydraulic servo. A regulator pressure that is generated by the regulator valve can be supplied as the input pressure to the linear solenoid valve 10, and the output pressure generated by the linear solenoid valve 10 can be supplied to the hydraulic servo via the control valve and the shift valve.

In this embodiment, a normally closed type of linear solenoid valve 10 has been explained, but the present invention can also be applied to a normally open type of linear solenoid valve.

In this embodiment, in order from the non-driving portion side to the driving portion side, the spool 26 includes the land 66, the groove 67, the land 68, the groove 79, the land 70, and the plunger contact portion 71; the groove 79 includes the first tapered portion 86, the neck portion 85, and the second and third tapered portions 87, 88; the valve main body 62 includes the feedback port p3, the input port p1, the output port p2, and the drain port p4; but these parts can be arranged in order from the driving portion side to the non-driving portion side.

Note that the present invention is not limited by the embodiment described above. Various modifications can be made based on the purpose of the present invention, and it is intended that all modifications within the spirit and scope of the present invention be included.

The invention claimed is:

1. A spool valve system, comprising:
   a valve main body with, from a first side to a second side, an input port to which an input pressure is supplied, an output port that outputs an output pressure, and a drain port that discharges the input pressure; and
   a spool that is structured to move freely relative to the valve main body, the spool including, from the first side to the second side, a first land, a groove that is formed adjacent to the first land, and a second land that is formed adjacent to the groove, wherein:
   the groove includes, from the first side to the second side, a first tapered portion that is formed from the first land to a neck portion, the neck portion, a second tapered portion that is formed from the neck portion to a third tapered portion, and the third tapered portion that is formed between the second tapered portion and the second land;
   an angle of the third tapered portion in relation to an axial center of the spool is smaller than an angle of the second tapered portion in relation to the axial center of the spool;
   the second tapered portion is formed such that, when an axial direction edge portion between the first land and the groove is positioned between an axial direction edge portion on a non-driving portion side of the input port and an axial direction edge portion on a driving portion side of the input port, a face of the output port that extends in a radial direction is positioned on a line that is an extension of the second tapered portion, and oil supplied by the input port is discharged from the output port; and
   the second land is formed such that, when a prescribed amount of the oil passes through a gap between an axial direction edge portion on a non-driving portion side of the drain port and an axial direction edge portion on a non-driving portion side of the second land and is sent to the drain port, the ratio of the flow through the input port and the drain port is controlled, and adjusted hydraulic pressure is output as output pressure from the output port.

2. The spool valve system according to claim 1, wherein:
   a distance in the radial direction between an outside perimeter face of the first land and the neck portion is $\alpha$, and a distance in the axial direction between an axial direction edge portion of the first land on a driving portion side and the neck portion is $\beta$, and
   the position of the neck portion is set such that the distances $\alpha$ and $\beta$ are approximately equal.

3. The spool valve system according to claim 1, wherein;
a distance in the radial direction between an outside perimeter face of the first land and a narrowest portion of the neck portion is α, and a distance in the axial direction between an axial direction edge portion of the first land on a driving portion side and the neck portion is β,
the position of the neck portion is set such that the distances α and β are approximately equal.

4. The spool valve system according to claim 1, wherein the first tapered portion is formed at an angle no greater than 45 degrees in relation to the axial center of the spool.

5. The spool valve system according to claim 1, wherein the first tapered portion is formed at an angle that is approximately 45 degrees in relation to the axial center of the spool.

6. The spool valve system according to claim 1, wherein a line pressure is supplied as the input pressure.

7. The spool valve system according to claim 1, wherein the first tapered portion extends further outward in the radial direction than the second tapered portion.

8. The spool valve system according to claim 1, wherein the first land extends further outward in the radial direction than the first tapered portion.

9. The spool valve system according to claim 1, wherein the line is an imaginary line that extends from the second tapered portion to the face of the output port at the angle of the second tapered portion in relation to the axial center of the spool.

* * * * *